United States Patent [19]

Petruska et al.

[11] 4,206,367
[45] Jun. 3, 1980

[54] ENERGY SAVING DEVICE

[75] Inventors: George Petruska, Whitehall; Sylvester Wood, Allentown, both of Pa.

[73] Assignee: WPL Energy Systems, Inc., Allentown, Pa.

[21] Appl. No.: 876,041

[22] Filed: Feb. 8, 1978

[51] Int. Cl.² ........................................... H02M 5/293
[52] U.S. Cl. ........................................... 307/2; 307/5; 307/72; 363/43; 363/133; 320/5
[58] Field of Search ................... 307/66, 1-2, 307/4-5, 44, 46, 48, 49, 72; 363/43, 133-134; 320/14, 5

[56] References Cited
U.S. PATENT DOCUMENTS
3,225,209  12/1965  Schuster .................................. 363/134

Primary Examiner—Michael L. Gellner
Assistant Examiner—S. D. Schreyer
Attorney, Agent, or Firm—Clarence A. O'Brien; Harvey B. Jacobson

[57] ABSTRACT

The current from an external AC power source is rectified to charge a DC battery and conduct current therethrough in series with a load during one-half of each power cycle of the external source. During the other half of each cycle, current is conducted through the load by discharge of the battery through a transistor that is switched to its conductive state by a phase control transformer connected to the power source.

12 Claims, 3 Drawing Figures

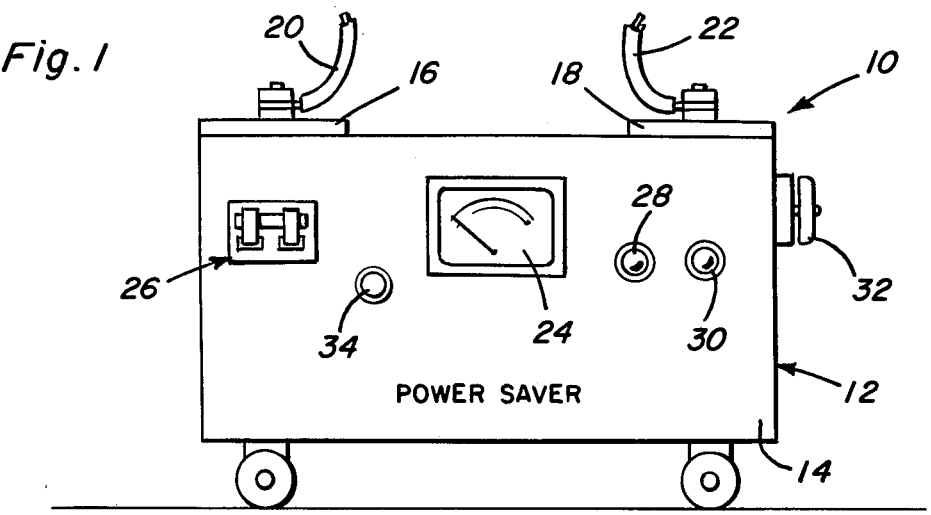
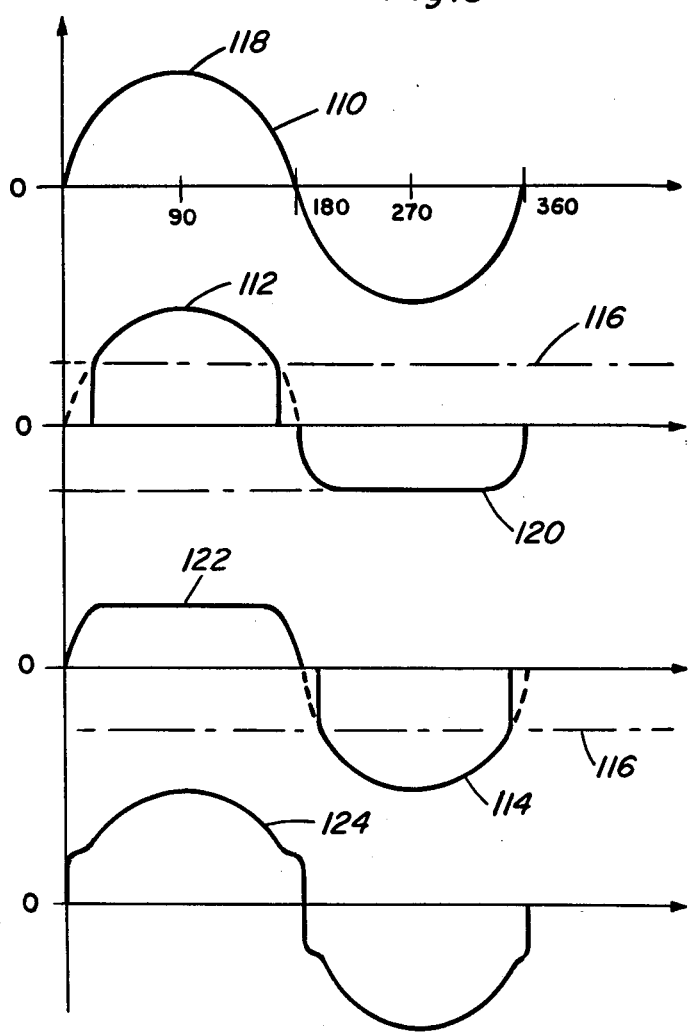

ENERGY SAVING DEVICE

BACKGROUND OF THE INVENTION

This invention relates to electrical power supplies in general and in particular to an AC power supply augmented by an internal DC battery source.

Power supplies having an internal DC battery are well known as disclosed for example in U.S. Pat. No. 3,319,074 to Koch, wherein an external AC source is rectified and applied to a load under control of a transistor. The DC battery compensates for any fluctuations of the AC source and is maintained in a fully charged condition according to the Koch patent. Operation of such power supplies while designed to maintain a constant voltage on the load, introduces additional power losses and does not cope with the varying demands of AC loads insofar as the efficient supply of energy is concerned.

It is therefore an important object of the present invention to provide an AC power supply of the type having an internal DC battery, which operates to reduce the power drawn from the external AC source to which the power supply in connected.

SUMMARY OF THE INVENTION

In accordance with the present invention, electrical loads are coupled by means of a load transformer to a DC battery from which current is drawn during a battery discharge phase occurring during one-half of each sinusoidal voltage cycle associated with an external AC power source generally made available by power utilities. During the other half of the cycle, the battery is sequentially recharged to its battery voltage and then conducts current in the opposite direction through the load. The battery is connected in series with the load through the primary winding of a load transformer and is connected to the external AC power source through a current rectifier. A transistor connected to the battery is switched to a conductive state to effect discharge of the battery under control of a voltage step-down transformer connected to the AC power souce whereby current is drawn from the battery only while the current rectifier is non-conductive.

It has been found from measurements taken during operation, that loads may be operated with less energy drawn from the external AC power source connected to the load through the power supply device of the present invention. Further, this has been achieved without measurable reduction in battery voltage.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 1 is a front elevation view of a typical power supply device constructed in accordance with the present invention.

FIG. 3 is a graphical diagram showing various current characteristics associated with the system of the present invention.

DETAILED DESCRIPTION OF PREFERRED EMBODIMENT

Figure 2:
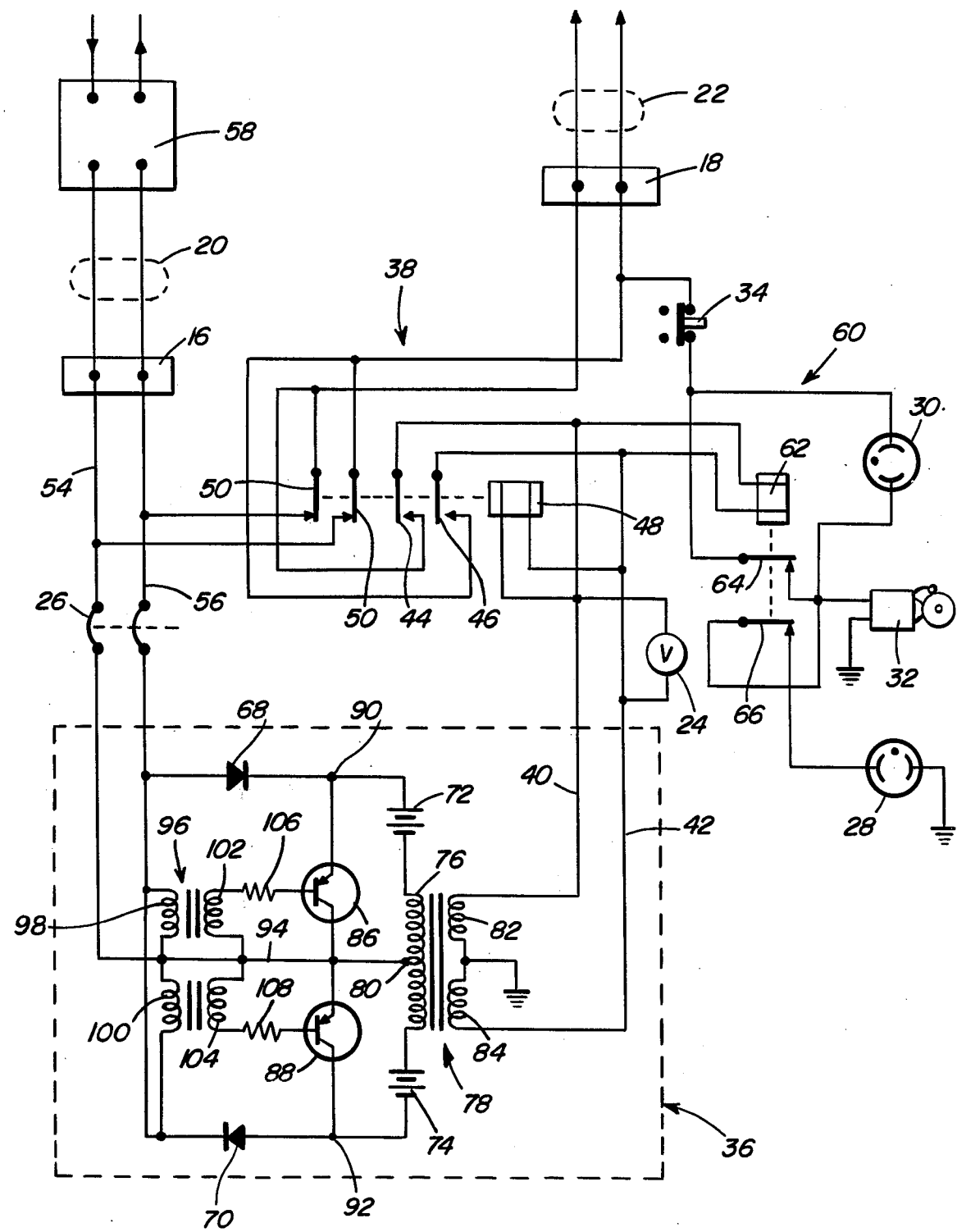
FIG. 2 is a circuit diagram of the power supply system of the present invention.

Referring now to the drawings in detail, FIG. 1 illustrates one embodiment of the present invention in the form of a mobile power supply device generally denoted by reference numeral 10 supported within an outer housing 12 having a front control panel 14. Input and output terminal bars 16 and 18 respectively connect the power supply device through cables 20 and 22 to an external AC power source of a power utility and to the electrical loads within a home or industrial installation. A meter 24 on the control panel monitors the energy being delivered to the loads connected to the cable 22. The control panel also mounts a circuit breaker 26 for the input to the power supply device and a pair of indicator lamps 28 and 30 which are illuminated to signify power by-pass or malfunction of the power supply device. An audible alerting device 32 is operated whenever there is a temporary interruption of power transmission through the device 10. The alerting device may be turned off together with lamp 30 by actuation of push-button switch 34 if power transmission through the device is restored. During any interruption in power transmission, a direct connection of the external AC power source to the loads is automatically established to prevent any interruption in electrical service.

As shown in FIG. 2, automatic power by-pass of the power supply circuit 36 is effected by a control relay circuit 38 in response to the absence of any energizing voltage across the output power lines 40 and 42 adapted to be connected by normally open relay switches 44 and 46 to the conductors of the power output cable 22. The relay switches 44 and 46 are therefore closed during normal operation of the power supply circuit 36 by energization of the relay coil 48 connected across the power output lines. When energized, the relay coil 48 opens the normally closed relay switches 50 and 52 through which the power input lines 54 and 56 of the power supply circuit are connected directly to the conductors in the power output cable 22. The input lines 54 and 56 are connected through the conductors of cable 20 and a utility meter 58 to the external AC power source. The circuit breaker 26 aforementioned interrupts the supply of energy through input lines 54 and 56 to the power supply circuit.

Section 60 of the device 10 as shown in FIG. 2, monitors operation of the power supply circuit and includes the volt meter 24 connected across output lines 40 and 42, in parallel with a relay coil 62 with which a pair of normally closed relay switches 64 and 66 are associated. Relay switch 64 is connected through push button switch 34 to output line 42 through relay switch 46 and to input line 54 through relay switch 50 in order to energize the audible alerting device 32 when relay coil 62 is deenergized. The relay coil 62 is maintained energized to prevent operation of the alerting device 32 as long as the power supply circuit is in operation establishing an output voltage across output lines 40 and 42. Any momentary interruption in the output voltage will deenergize the relay coil 62 momentarily to close relay switch 64 and operate the alerting device 32 as well as to ignite the neon type indicator lamp 30 connected across the relay switch 64. The lamp 30 will remain conductive to continue operation of the audible alerting device when relay switch 64 opens as the power supply circuit resumes operation. To extinguish lamp 30 and stop operation of the device 32, the push-button switch 34 must be actuated to open the energizing circuit for the lamp 30. The other indicator lamp 28 energized by closing of relay switch 66 but is immediately upon energization of relay coil 62 to indicate that the circuit 36 has resumed operation.

The power supply circuit 36 includes current rectifier means in the form of a pair of rectifier diodes 68 and 70 connected to input line 56. The diodes conduct current in opposite directions in series through a pair of DC batteries 72 and 74 and the primary winding 76 of a load transformer 78 having a primary center tap 80 connected by line 94 to the other power line 54. Secondary winding sections 82 and 84 of the load transformer are interconnected between common ground and the output lines 40 and 42. The battery 72 has its positive terminal connected to the cathode of diode 68 and its negative terminal connected to one end of the primary winding 76. The battery 74 on the other hand, has its positive terminal connected to the other end of the primary winding 76 and its negative terminal connected to the anode of diode 70. Current will be conducted through diode 68 during the positive half of the alternating current cycle of the power applied to input lines 54 and 56 after the input voltage exceeds the battery voltage at which point the current will be conducted through the battery 72, in series with the load presented by transformer 78, for the remainder of the positive half of the cycle. During the negative half of the cycle, diode 70 similarly conducts current in the other direction.

During those periods of each cycle when the diodes 68 or 70 is non-conducting, current is drawn from the battery 72 or 74 under control of a pair of NPN transistors 86 and 88. The collectors of the transistors are respectively connected to junctions 90 and 92 between the diodes and the batteries while the emitters are connected by common line 94 to the center tap 80. Thus, when switched on, each transistor will complete a circuit loop through the battery 72 or 74 in series with one-half of the primary winding 76. The transistors are switched on and off in out-of-phase relation to the conductive periods of the diodes 68 and 70 by means of a phase control transformer 96. Transformer 96 is of the voltage step-down type and includes primary winding sections 98 and 100 interconnected at the common line 94 to induce reduced voltages of opposite polarity in secondary winding sections 102 and 104. The secondary winding sections are also interconnected at the common line 94 and apply control voltage through bias resistors 106 and 108 to the bases of transistors 86 and 88 causing them to switch on when the corresponding diode is non-conductive.

As shown in FIG. 3, the voltage applied across the input lines 54 and 56 typically varies sinusoidally each cycle as indicated by waveform curve 110. Rectified current as indicated by curves 112 and 114 are conducted by diodes 68, 70 respectively during the positive and negative halves of the cycle. However, the rectified currents are blocked during a portion of each half cycle, as indicated by dotted lines associated with curves 112 and 114, by the opposing battery operating potential 116 which is less than the peak voltage 118 of the external AC power source. A battery generated current is conducted through the winding 76 by the transistors 86 and 88 during the non-conductive periods of the diodes as diagrammatically shown by curves 120 and 122 in FIG. 3. The currents conducted through the primary winding 76 are mixed to produce a resultant sinusoidal current as shown by curve 124.

The batteries 72 and 74 while conducting rectified current through the winding 76 are recharged so that they are maintained in a fully charged condition despite the current drain that occurs each cycle during the non-conductive periods of the diodes. The batteries thus act as current collecting devices and not as independent power sources. The transistors 86 and 88 merely control the periods of battery drain.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an AC source of voltage and an electrical load, a power supply for said load comprising a DC battery having terminals of opposite polarity, means coupling one of said terminals of the battery to the load for conducting current from the AC source through the load in series with the battery, rectifier means connecting said AC source to the other of the terminals of the battery for conducting said current in one direction through the load, switch means connected to said other of the terminals for conducting current from the battery through the load in the other direction, and control means connected to the switch means for conducting the battery current therethrough in out-of-phase relation to the current conducted in said one direction by the rectifier means from the AC source.

2. The combination of claim 1 wherein said DC battery has an operating potential across the terminals thereof which is less than the peak voltage applied across said terminals by said AC source.

3. The combination of claim 2 wherein said switch means comprises a transistor having a collector-emitter circuit including said series connected battery and load, and a base connected to the control means.

4. The combination of claim 3 wherein said control means includes a phase control transformer coupling the AC source to the base of the transistor.

5. The combination of claim 4 wherein said coupling means includes a power output transformer having a primary winding connected to the said one of the terminals of the battery and a secondary winding connected to the load.

6. The combination of claim 1 wherein said switch means comprises a transistor having a collector-emitter circuit including said series connected battery and load, and a base connected to the control means.

7. The combination of claim 6 wherein said control means includes a phase control transformer coupling the AC source to the base of the transistor.

8. In combination with a power source having an AC voltage cycle, and an electrical load, a power supply device comprising a DC battery connected in series with said load, current rectifying means connecting the battery to the power source for sequentially charging the battery and conducting current through the load in series with the battery during a conductive phase of said cycle, switch means connected to the battery for discharge thereof, and control means connected to the power source for rendering the switch means operative only during a phase of the cycle when the current rectifying means is non-conductive.

9. The combination of claim 8 wherein said AC power source has a peak voltage exceeding the voltage of the battery, whereby current is conducted through the load in one direction during a portion of said conductive phase of the cycle.

10. The combination of claim 9 wherein the switch means conducts current through the load in the other direction during said discharge of the battery.

11. In combination with an AC source of voltage and a load adapted to be energized thereby, a power supply means system including a DC battery, means coupling the battery to the load for conducting current in one direction through the load during a discharging mode of the battery, phase control means connected to the source for rendering the battery operative in said discharging mode during one phase of each cycle of the AC source, and current rectifying means connecting the source to the battery for conducting current through the load in the other direction during another phase of said cycle, said battery operative during a portion of said other phase to block the current through the load.

12. The combination of claim 11 including by-pass means for directly connecting the AC source to the load in response to malfunction of the power supply system, and indicating means for signifying said malfunction.

* * * * *